Aug. 15, 1950     C. M. OSTERHELD     2,518,567
ELECTRIC IRON
Filed Aug. 27, 1945
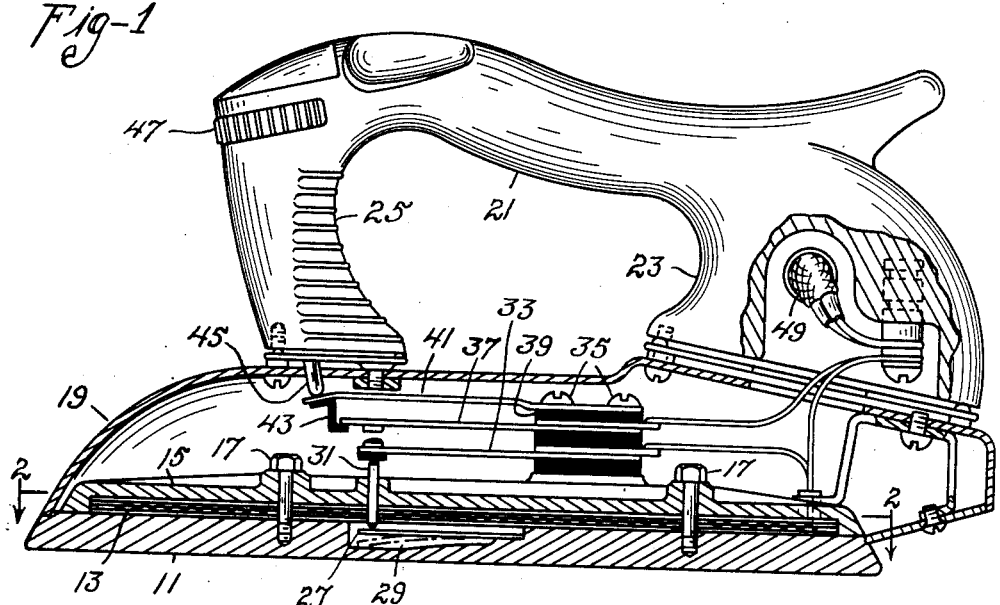
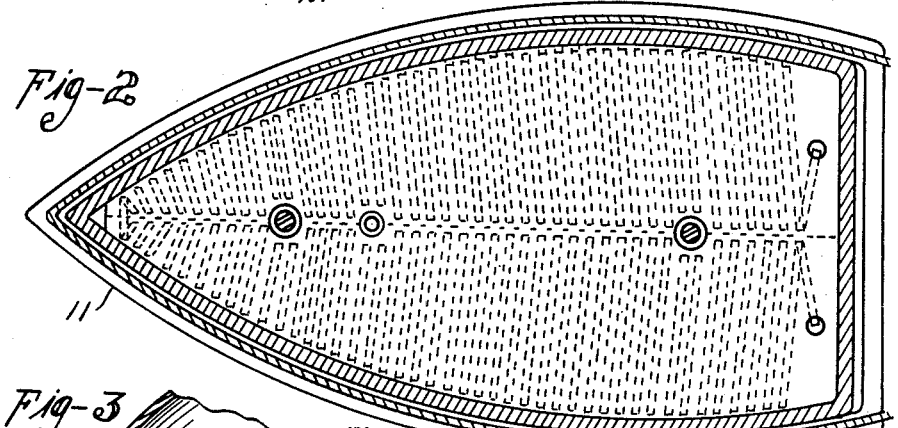
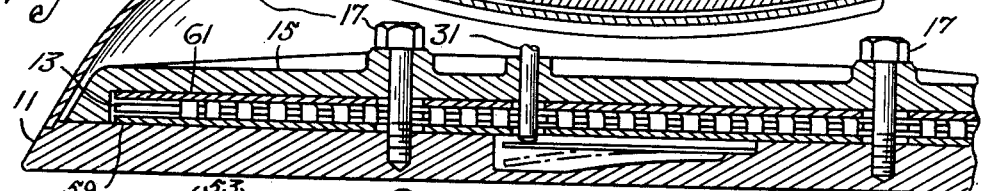
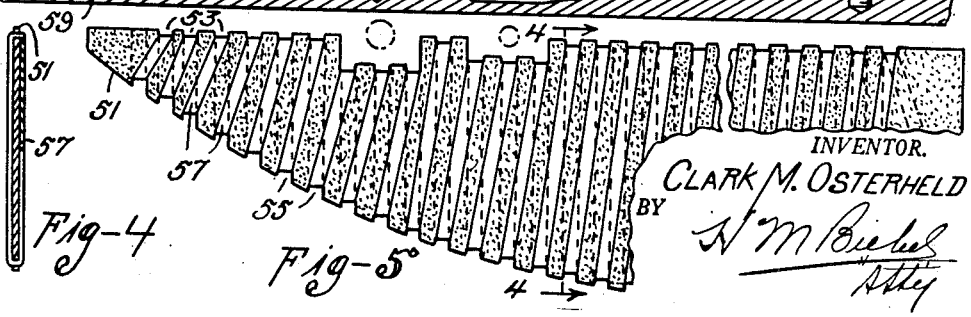
INVENTOR.
CLARK M. OSTERHELD Patented Aug. 15, 1950

2,518,567

UNITED STATES PATENT OFFICE 2,518,567

ELECTRIC IRON

Clark M. Osterheld, Stoughton, Wis., assignor to McGraw Electric Company, Elgin, Ill., a corporation of Delaware Application August 27, 1945, Serial No. 612,889

1 Claim. (Cl. 219—25)

My invention relates to sadirons and particularly to electrically heated sadirons.

An object of my invention is to provide a relatively simple structure for an electric sadiron.

Another object of my invention is to provide a novel means for insulating the heating element of an electric iron from the soleplate and the top plate.

Another object of my invention is to provide a heating element for an electric sadiron that shall reduce the temperature differential between the heating element and the ironing surface of the soleplate.

Other objects of my invention will either be apparent from a description of one form of device embodying my invention or will be pointed out in the course of such description and be set forth in the appended claim.

In the drawings,

Figure 1 is a vertical, longitudinal, partly sectional view through an iron embodying my invention, Fig. 2 is a horizontal, sectional view therethrough taken on the line 2—2 of Fig. 1, Fig. 3 is a fragmentary enlarged longitudinal, sectional view of part of Fig. 1, Fig. 4 is a sectional view taken on the line 4—4 of Fig. 5, and, Fig. 5 is an enlarged fragmentary plan view of one half of a heating element.

Referring first of all to Fig. 1 of the drawings, I have there shown an electric iron comprising a soleplate 11, an electric heating element 13, as well as a top plate 15, which latter is held in proper operative clamped position by two machine bolts 17 extending through the top plate and having screw-threaded engagement with the the soleplate. The soleplate 11 is made relatively light and of brass, copper or aluminum, and the top plate may be of brass, stainless steel, Mycalex or asbestos lumber. The soleplate 11, top plate 15 and the heating element 13 constitute the heated body of an electric iron. The iron includes also a casing 19 and a handle 21, which handle has a rear handle support 23 and a front handle support 25.

I provide also a means for controlling the temperatures of the ironing surface of the soleplate 11, which includes a bimetal bar 27, which has one end thereof secured against the upper surface of the soleplate 11 in a recess 29 therein. An actuating rod 31 rests upon the free end of bimetal bar 27 and is adapted to cause movement of the free end of a contact arm 33, which is held by a pair of machine screws 35 extending into the top plate 15. A second upper contact arm 37 is also held by the screws 35, washers 39 of electric insulating material being provided to properly insulate the contact arms 33 and 37 from each other. A spring arm 41 is also secured by the screws 35 and is biased in a clockwise direction. The free end of spring arm 41 is provided with a member 43 of electric-insulating material which has its lower end extended beneath contact arm 37. The spring arm 41 is adjustable as by means of a rod 45 which extends upwardly through the front handle support and has secured thereto at its upper end a wheel 47 which extends beyond or has a diameter greater than the adjacent portion of the front handle support so as to be operable by the thumb and the forefinger of the operator's hand. A twin conductor cord 49 is adapted to extend into the rear hollow handle support 23 and to be connected with the proper terminals of the heating element and of one of the contact arms hereinbefore described. I wish to here point out that the structure of the iron thus far described, except for the parts 11, 13 and 15, constitutes no part of my present invention but has been shown and described for the sake of completeness.

Referring now to Figs. 2 to 5 inclusive, I have there shown, particularly in Fig. 3 of the drawings, a heated body for a sadiron comprising the soleplate 11, the top plate 15, together with an electric heating element 13 which is tightly clamped between the sole and the top plates.

The heating element comprises two metal sheets 51 which may be of aluminum although not limited thereto. The thickness of each of the sheets 51 is on the order of .015 inch and each sheet is provided with a plurality of recesses 53 in its inner edge and with a plurality of recesses 55 in its outer edge. A metallic resistor strip 57 is wound in the recesses 53 and 55, the resistor strips wound on the two sheets 51 being connected in series electric circuit with each other.

I provide a lower metal sheet 59 positioned between the sheet 51 with the resistor strip wound therearound and an upper sheet 61 which is positioned between the sheets 51 an the resistor strip 57 wound therearound and the top plate.

While preferably the sheets 51, 59, and 61 are each made of aluminum with a thickness on the order of .015 inch, I do not desire to be limited thereto since any other metal of substantially the same thickness may be used in place of aluminum.

The entire outer surface of each of the sheets 51, 59, and 61 has thereon an inorganic, integral, high-temperature-resisting, heat-conducting and electric-insulating coating which may be produced as set forth in Patent No. 1,526,127, or by any other suitable means, which is effective to provide an anodic coating on the outer surface which has a thickness of less than .002 inch.

Thus I may provide the hereinbefore described anodic coating over the inner surface of the sheets 51 as well as over the entire surface of sheets 59 and 61. Again, I may provide the anodic coating over the entire surface of resistor strip 57 as well as on the upper surface of the lower sheet 59 and on the lower surface of the upper sheet 61. The general idea is to provide at least one layer of an anodic coating between the resistor strip 57 and the soleplate or top plate.

I may also provide a layer of the anodic coating on the upper surface of the soleplate 11 in addition to the hereinbefore described other layers of anodic coatings.

In actual use, the use of such very thin heat-conducting and electric-insulating anodic coating reduces the temperature differential between the strip 57 and the ironing surface of the soleplate 11 to such an extent that the excess temperature of said heating element over that of the ironing surface of the soleplate is not over on the order of 400° F.

I may also make the top plate 15 of a metal or of a material such as Mycalex or asbestos lumber, which has heat-insulating characteristics so as to retard the upward flow of heat and cause a downward flow of the heat generated in the resistor strip 57 toward the ironing surface of the soleplate 11. If the top plate is made of electric-insulating material the upper plate 61 may be dispensed with.

Various modifications may be made in the device embodying my invention without departing from the spirit and scope thereof and all such modifications coming clearly within the scope of the appended claim shall be considered as covered thereby.

I claim as my invention:

A heated body for an electric sadiron comprising a metallic sole plate comprising aluminum, a two-layer, planar, metallic heating element comprising aluminum, a thin aluminum plate around which said heating element is wrapped, a metallic top plate comprising aluminum, and a thin aluminum plate between said heating element and said sole plate and between said heating element and said top plate, the lower surface of said top plate, the entire surface of said metallic heating element and of said thin aluminum plates and the upper surface of said sole plate being covered by an inorganic, integral, high-temperature-resisting, heat-conducting, electric-insulating coating comprising an oxidation product of aluminum.

CLARK M. OSTERHELD.

REFERENCES CITED

The following references are of record in the file of this patent:

UNITED STATES PATENTS

| Number | Name | Date |
|---|---|---|
| 1,117,240 | Presser | Nov. 17, 1914 |
| 1,319,524 | Garlits | Oct. 21, 1919 |
| 1,583,460 | Hasson | May 4, 1926 |
| 1,874,542 | Kaul | Aug. 30, 1932 |
| 2,049,089 | Stackhouse | Aug. 13, 1934 |
| 3,124,984 | McCullough | Mar. 28, 1936 |
| 2,228,101 | Willmann | Feb. 12, 1938 |
| 2,274,390 | Weeks | June 17, 1941 |

FOREIGN PATENTS

| Number | Country | Date |
|---|---|---|
| 15,896 | Great Britain | of 1909 |